US011960625B2

(12) United States Patent
Mummareddi et al.

(10) Patent No.: US 11,960,625 B2
(45) Date of Patent: Apr. 16, 2024

(54) SYSTEMS AND METHODS FOR PROTECTING SENSITIVE DATA IN USER ONLINE ACTIVITIES

(71) Applicant: JPMORGAN CHASE BANK, N.A., New York, NY (US)

(72) Inventors: Pavan Mummareddi, Newark, DE (US); Ishank Paharia, Newark, DE (US); Howard Spector, Woolwich, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 236 days.

(21) Appl. No.: 17/313,678

(22) Filed: May 6, 2021

(65) Prior Publication Data

US 2022/0358246 A1 Nov. 10, 2022

(51) Int. Cl.
*G06F 21/62* (2013.01)
*G06F 9/54* (2006.01)
*G06F 16/953* (2019.01)
*H04L 9/40* (2022.01)

(52) U.S. Cl.
CPC .......... *G06F 21/6254* (2013.01); *G06F 9/541* (2013.01); *G06F 16/953* (2019.01); *H04L 63/0281* (2013.01); *H04L 63/08* (2013.01)

(58) Field of Classification Search
CPC .... G06F 21/6254; G06F 9/541; G06F 16/953; G06F 21/6245; H04L 63/0281; H04L 63/08; H04L 63/0407; H04L 63/108; H04W 12/61; H04W 12/02
See application file for complete search history.

(56) References Cited

U.S. PATENT DOCUMENTS

| | | | | |
|---|---|---|---|---|
| 6,611,881 B1 * | 8/2003 | Gottfurcht | ............ | G16H 20/10 710/72 |
| 7,103,782 B1 * | 9/2006 | Tugenberg | ............ | G06F 21/78 713/193 |
| 9,305,042 B1 * | 4/2016 | Archbold | ............... | G06Q 40/12 |
| 9,881,178 B1 * | 1/2018 | Brown | ............... | H04M 3/5183 |
| 10,015,651 B1 * | 7/2018 | Chauhan | ........... | G06Q 30/0633 |
| 10,051,001 B1 * | 8/2018 | Ashley | .................. | H04L 63/083 |
| 10,223,538 B1 * | 3/2019 | Cignetti | ................. | G06F 21/53 |

(Continued)

*Primary Examiner* — Aravind K Moorthy
(74) *Attorney, Agent, or Firm* — GREENBERG TRAURIG LLP

(57) ABSTRACT

A method for local data storage governance may include: authenticating, by a privacy service computer program, a user accessing the privacy service using a privacy application; receiving, by the privacy service computer program and from a proxy service, user activity data; saving, by the privacy service computer program, the user activity data to a privacy database; receiving, by the privacy service computer program and from the privacy application, a request for the user activity data; retrieving, by the privacy service computer program and from the privacy database, the user activity data; communicating, by the privacy service computer program, the user activity data to the privacy application, wherein the privacy application stores the user activity data in local storage; receiving, by the privacy service computer program, an acknowledgement of the user activity data; and purging, by the privacy service computer program, the user activity data from the privacy database.

17 Claims, 2 Drawing Sheets

(56) References Cited

U.S. PATENT DOCUMENTS

| | | | | |
|---|---|---|---|---|
| 10,484,234 | B1* | 11/2019 | Sun | H04L 41/0631 |
| 10,771,468 | B1* | 9/2020 | Walker | H04L 63/0281 |
| 10,841,266 | B1* | 11/2020 | Jayaraman | H04L 51/046 |
| 11,157,572 | B1* | 10/2021 | Anima | G06F 16/24575 |
| 11,270,311 | B1* | 3/2022 | Jass | G06Q 20/388 |
| 11,438,324 | B2* | 9/2022 | Hayes | H04W 12/069 |
| 11,509,635 | B1* | 11/2022 | Jain | G06F 21/602 |
| 11,748,510 | B1* | 9/2023 | Beveridge | G06F 21/6245 |
| | | | | 726/27 |
| 2002/0099566 | A1* | 7/2002 | Kobayashi | G06Q 30/06 |
| | | | | 705/50 |
| 2002/0124180 | A1* | 9/2002 | Hagman | G06F 3/04817 |
| | | | | 726/26 |
| 2002/0135816 | A1* | 9/2002 | Ohwa | H04N 1/444 |
| | | | | 358/474 |
| 2002/0178366 | A1* | 11/2002 | Ofir | G06F 21/6245 |
| | | | | 713/182 |
| 2003/0182232 | A1* | 9/2003 | Zeltzer | G16H 10/60 |
| | | | | 705/51 |
| 2004/0006715 | A1* | 1/2004 | Skrepetos | G06F 21/6245 |
| | | | | 726/33 |
| 2007/0192854 | A1* | 8/2007 | Kelley | G06F 21/566 |
| | | | | 726/22 |
| 2007/0214508 | A1* | 9/2007 | Fukui | H04N 1/00501 |
| | | | | 726/28 |
| 2007/0220268 | A1* | 9/2007 | Krishnaprasad | G06F 16/2455 |
| | | | | 713/182 |
| 2007/0283425 | A1* | 12/2007 | Ture | G06F 16/951 |
| | | | | 726/5 |
| 2008/0040502 | A1* | 2/2008 | Holsberry | G06Q 10/087 |
| | | | | 379/202.01 |
| 2008/0065905 | A1* | 3/2008 | Salessi | G06F 21/31 |
| | | | | 713/193 |
| 2008/0148057 | A1* | 6/2008 | Hauw | G06F 21/34 |
| | | | | 713/185 |
| 2008/0177761 | A1* | 7/2008 | Feng | G06Q 30/02 |
| 2008/0222728 | A1* | 9/2008 | Chavez | H04L 51/212 |
| | | | | 726/24 |
| 2008/0274759 | A1* | 11/2008 | Chen | H04W 72/30 |
| | | | | 455/507 |
| 2008/0320310 | A1* | 12/2008 | Florencio | G06F 21/31 |
| | | | | 713/184 |
| 2009/0300675 | A1* | 12/2009 | Shkedi | H04N 7/17318 |
| | | | | 725/34 |
| 2010/0048169 | A1* | 2/2010 | Yan | G06F 21/78 |
| | | | | 709/201 |
| 2010/0057623 | A1* | 3/2010 | Kapur | G06Q 20/12 |
| | | | | 705/72 |
| 2010/0145810 | A1* | 6/2010 | Pourfallah | G06Q 20/12 |
| | | | | 705/17 |
| 2011/0081006 | A1* | 4/2011 | Hao | H04M 3/53333 |
| | | | | 379/88.13 |
| 2011/0087896 | A1* | 4/2011 | Thom | G06F 21/34 |
| | | | | 713/193 |
| 2011/0216905 | A1* | 9/2011 | Gavalda | G10L 19/008 |
| | | | | 381/1 |
| 2012/0159564 | A1* | 6/2012 | Spektor | H04L 63/08 |
| | | | | 718/100 |
| 2012/0210119 | A1* | 8/2012 | Baxter | G06Q 30/0253 |
| | | | | 713/150 |
| 2012/0240237 | A1* | 9/2012 | Kanevsky | G06F 16/957 |
| | | | | 726/26 |
| 2012/0309354 | A1* | 12/2012 | Du | H04W 12/126 |
| | | | | 455/410 |
| 2013/0036023 | A1* | 2/2013 | Koplovitz | G06Q 20/3223 |
| | | | | 705/26.8 |
| 2013/0061290 | A1* | 3/2013 | Mendel | G06Q 20/405 |
| | | | | 726/4 |
| 2013/0074142 | A1* | 3/2013 | Brennan | G06F 21/6245 |
| | | | | 726/1 |
| 2013/0197933 | A1* | 8/2013 | Whitlow | G06Q 40/08 |
| | | | | 705/3 |
| 2014/0019225 | A1* | 1/2014 | Guminy | G06Q 30/02 |
| | | | | 705/14.39 |
| 2014/0282981 | A1* | 9/2014 | Satpathy | H04W 12/06 |
| | | | | 726/8 |
| 2014/0324192 | A1* | 10/2014 | Baskaran | G05B 15/02 |
| | | | | 700/19 |
| 2015/0007291 | A1* | 1/2015 | Miller | H04W 12/062 |
| | | | | 726/7 |
| 2015/0187201 | A1* | 7/2015 | Yuksel | G06Q 10/109 |
| | | | | 340/539.13 |
| 2015/0199523 | A1* | 7/2015 | Hamilton | G06F 21/6245 |
| | | | | 726/27 |
| 2015/0213288 | A1* | 7/2015 | Bilodeau | G06F 21/6254 |
| | | | | 726/26 |
| 2015/0220751 | A1* | 8/2015 | Syben | G06F 16/125 |
| | | | | 713/193 |
| 2015/0281227 | A1* | 10/2015 | Fox Ivey | H04L 9/3226 |
| | | | | 713/168 |
| 2015/0288770 | A1* | 10/2015 | Owens | H04L 67/535 |
| | | | | 709/224 |
| 2016/0049975 | A1* | 2/2016 | Uy | H04W 8/205 |
| | | | | 455/558 |
| 2016/0314286 | A1* | 10/2016 | Dusad | H04L 63/083 |
| 2016/0321650 | A1* | 11/2016 | Fedak | G06Q 20/3821 |
| 2016/0358086 | A1* | 12/2016 | Sundram | G06F 40/30 |
| 2016/0364573 | A1* | 12/2016 | Chan | G06F 21/6218 |
| 2016/0379639 | A1* | 12/2016 | Weinstein | H04W 4/02 |
| | | | | 704/235 |
| 2017/0085658 | A1* | 3/2017 | Todd | H04L 67/306 |
| 2017/0372385 | A1* | 12/2017 | Yeung | G06Q 30/0283 |
| 2018/0096102 | A1* | 4/2018 | Akinmeji | G16H 10/60 |
| 2018/0150812 | A1* | 5/2018 | Kurian | G07F 19/203 |
| 2018/0232534 | A1* | 8/2018 | Dotan-Cohen | H04W 12/033 |
| 2018/0253666 | A1* | 9/2018 | Fix | G06Q 10/02 |
| 2018/0314844 | A1* | 11/2018 | Testerman | G06F 21/6236 |
| 2018/0351962 | A1* | 12/2018 | Kulkarni | H04W 12/64 |
| 2018/0359223 | A1* | 12/2018 | Maier | H04L 63/101 |
| 2018/0359272 | A1* | 12/2018 | Mizrachi | H04L 67/535 |
| 2018/0373891 | A1* | 12/2018 | Barday | G06F 15/76 |
| 2018/0373893 | A1* | 12/2018 | Benker | G06F 16/162 |
| 2019/0034652 | A1* | 1/2019 | Kludy | G06F 21/6218 |
| 2019/0036913 | A1* | 1/2019 | Tzur-David | H04L 63/18 |
| 2019/0050378 | A1* | 2/2019 | Novak | G06F 40/143 |
| 2019/0109706 | A1* | 4/2019 | Peterson | H04L 9/0825 |
| 2019/0180052 | A1* | 6/2019 | Barday | H04L 67/51 |
| 2019/0197217 | A1* | 6/2019 | Donovan | G06F 11/3476 |
| 2019/0332803 | A1* | 10/2019 | Barday | G06F 15/76 |
| 2019/0334903 | A1* | 10/2019 | Lerner | H04L 63/10 |
| 2019/0342088 | A1* | 11/2019 | Eidson | H04L 9/14 |
| 2020/0005294 | A1* | 1/2020 | Rangaraj | G06Q 20/3226 |
| 2020/0082103 | A1* | 3/2020 | Heidinga | G06F 21/54 |
| 2020/0082115 | A1* | 3/2020 | Ball | H04L 63/0407 |
| 2020/0195792 | A1* | 6/2020 | Mizuno | H04N 1/00832 |
| 2020/0244797 | A1* | 7/2020 | Horelik | H04L 63/0407 |
| 2020/0329025 | A1* | 10/2020 | Kahn | H04L 63/0838 |
| 2021/0067553 | A1* | 3/2021 | Ries | H04L 63/08 |
| 2021/0099458 | A1* | 4/2021 | Su | H04L 63/102 |
| 2021/0182422 | A1* | 6/2021 | Basu | H04L 63/1466 |
| 2021/0192075 | A1* | 6/2021 | Sweeney | G06F 21/6245 |
| 2021/0234700 | A1* | 7/2021 | Ali | H04L 9/3226 |
| 2021/0264053 | A1* | 8/2021 | Shortell | G06F 21/31 |
| 2021/0334402 | A1* | 10/2021 | Detchemendy | H04L 63/1425 |
| 2021/0392140 | A1* | 12/2021 | Si | H04L 63/20 |
| 2022/0012773 | A1* | 1/2022 | Lee | G06F 21/6245 |
| 2022/0043903 | A1* | 2/2022 | Kataoka | G06K 19/06037 |
| 2022/0067214 | A1* | 3/2022 | Preiss | G06F 21/45 |
| 2022/0207636 | A1* | 6/2022 | Nalluri | G06F 21/6245 |
| 2022/0222372 | A1* | 7/2022 | Larson | G06N 20/00 |
| 2022/0286476 | A1* | 9/2022 | Carroll | H04L 63/1416 |
| 2022/0335158 | A1* | 10/2022 | Xu | G06F 21/6227 |

* cited by examiner

SYSTEMS AND METHODS FOR PROTECTING SENSITIVE DATA IN USER ONLINE ACTIVITIES

BACKGROUND OF THE INVENTION

1. Field of the Invention

Embodiments relate generally to systems and methods for local data storage.

2. Description of the Related Art

Organizations, such as financial institutions, store personally identifiable information, or PII, for their customers. Certain of the organization's employees may need to access this PII as part of their job requirements. Granting access to employees often requires managers to review and approve requests, and to have the approval stored for audit purposes. Because there can be a substantial number of databases, this may be a long and involved process.

SUMMARY OF THE INVENTION

Systems and methods for personally identifiable information metadata governance are disclosed. In one embodiment, a method for local data storage governance may include: (1) authenticating, by a privacy service computer program, a user accessing the privacy service using a privacy application on an electronic device; (2) receiving, by the privacy service computer program and from a proxy service, user activity data; (3) saving, by the privacy service computer program, the user activity data to a privacy database; (4) receiving, by the privacy service computer program and from the privacy application, a request for the user activity data; (5) retrieving, by the privacy service computer program and from the privacy database, the user activity data; (6) communicating, by the privacy service computer program, the user activity data to the privacy application, wherein the privacy application stores the user activity data in local storage on the electronic device; (7) receiving, by the privacy service computer program, an acknowledgement of receipt of the user activity data; and (8) purging, by the privacy service computer program, the user activity data from the privacy database.

In one embodiment, the user activity data may be collected in an interaction with a website or domain.

In one embodiment, the user activity data may include personally identifiable information, electronic device identifying information, location data, browsing behavior, domains accessed, and/or advertisements.

In one embodiment, the method may further include cleaning, by the privacy service computer program, the user activity data of any identifying information.

In one embodiment, the method may further include making available, by the privacy service computer program, the cleaned user activity data to a consuming entity.

In one embodiment, the method may further include purging, by the privacy service computer program, the user activity data following expiration of a "time to live" period.

In one embodiment, an amount and/or a type user activity data communicated to the privacy application may be based on a parameter.

In one embodiment, the request for the user activity data or the acknowledgement of receipt of the user activity data may be communicated as an Application Programmable Interface (API).

According to another embodiment, an electronic device may include a memory storing a privacy service computer program and a computer processor. The privacy service computer program may be configured to: authenticate a user accessing the privacy service using a privacy application on an electronic device; receive, from a proxy service, user activity data; save the user activity data to a privacy database; receive, from the privacy application, a request for the user activity data; retrieve, from the privacy database, the user activity data; communicate the user activity data to the privacy application, wherein the privacy application stores the user activity data in local storage on the electronic device; receive an acknowledgement of receipt of the user activity data; and purge the user activity data from the privacy database.

In one embodiment, the user activity data may be collected in an interaction with a website or domain.

In one embodiment, the user activity data may include personally identifiable information, electronic device identifying information, location data, browsing behavior, domains accessed, and/or advertisements.

In one embodiment, the privacy service computer program may be further configured to clean the user activity data of any identifying information.

In one embodiment, the privacy service computer program may be further configured to make the cleaned user activity data available to a consuming entity.

In one embodiment, the privacy service computer program may be further configured to purge the privacy service computer program, the user activity data following expiration of a "time to live" period.

In one embodiment, an amount and/or a type user activity data communicated to the privacy application may be based on a parameter.

In one embodiment, the request for the user activity data or the acknowledgement of receipt of the user activity data may be communicated as an Application Programmable Interface (API).

According to another embodiment, a system for local data storage governance may include an electronic device comprising a memory storing a privacy application and a local data store; a privacy server executing a privacy service computer program; and a privacy database. The privacy application may be configured to receive, from a user, authenticating information and communicate the authenticating information to the privacy service computer program. The privacy service computer program may be configured to authenticate the user. The privacy service computer program may be configured to receive, from a proxy service, user activity data collected in an interaction with a website or domain. The privacy service computer program may be configured to save the user activity data to a privacy database. The privacy service computer program may be configured to receive, from the privacy application, a request for the user activity data. The privacy service computer program may be configured to retrieve, from the privacy database, the user activity data. The privacy service computer program may be configured to communicate the user activity data to the privacy application, wherein the privacy application stores the user activity data in local storage on the electronic device. The privacy application may be configured to communicate an acknowledgement of receipt of the user activity data to the privacy service computer program. The privacy service computer program may be configured to purge the user activity data from the privacy database.

In one embodiment, the user activity data may include personally identifiable information, electronic device identifying information, location data, browsing behavior, domains accessed, and/or advertisements.

In one embodiment, the privacy service computer program may be further configured to clean the user activity data and to make the clean user activity data available to a consuming entity.

In one embodiment, the request for the user activity data or the acknowledgement of receipt of the user activity data may be communicated as an Application Programmable Interface (API).

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for local data storage.

Embodiments introduce a layer of security that the computer application may consult before making an outbound call. This layer verifies that the call that is to be made is safe to execute.

In embodiments, Application Programmable Interfaces (APIs) may be used to synchronize data, acknowledge the data, and delete the data. In one embodiment, the APIs may be exposed as a software as a service solution.

Figure 1:
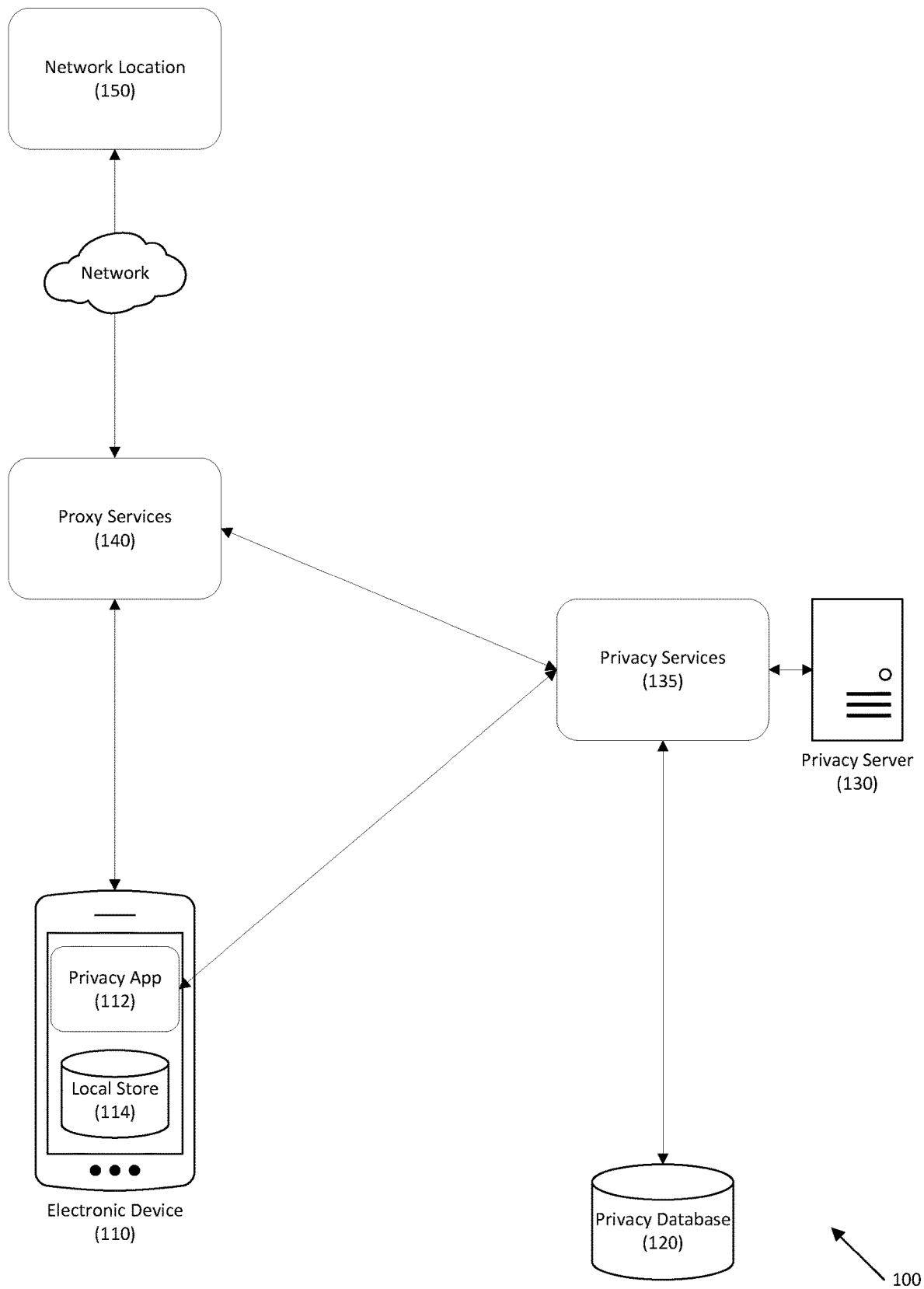
FIG. 1 is a depicts a system for local data storage according to an embodiment.

Referring to FIG. 1, a system for local data storage is disclosed according to one embodiment. System 100 may include electronic device 110 that may execute privacy program or application 112 and may include local store 114. Electronic device 110 may be any suitable electronic device, including smartphones, tablet computers, notebook computers, desktop computers, workstations, servers, Internet of Things (IoT) appliances, etc.

Privacy program or application 112 may manage the sending, receiving, and/or storage of data in local store 114.

Local store 114 may be any suitable storage within electronic device 110. In one embodiment, data stored in local store may be encrypted or otherwise protected as is necessary and/or desired.

Privacy server 130 may be any suitable server, including physical servers, cloud-based servers, etc. Privacy server 130 may provide privacy services 135.

System 100 may further include privacy database 120. Privacy database 120 may temporarily store user data, such as user activity data, that may be received from proxy services 140 during an online activity (e.g., browsing to or accessing a website or network location 150 with a browser or application, etc.). User activity data may include personal identifiable information (PII) for the user and/or identifying information for electronic device 110, payment information, location data, IP addresses, user and activity logs, etc. In one embodiment, privacy services 135 may receive user data from proxy services 140 and may store the user data in privacy database 120.

In one embodiment, privacy services 135 may obfuscate or otherwise remove any PII for the user and/or identifying information for electronic device 110 from the user data and make it available for a data consumer (not shown).

Figure 2:
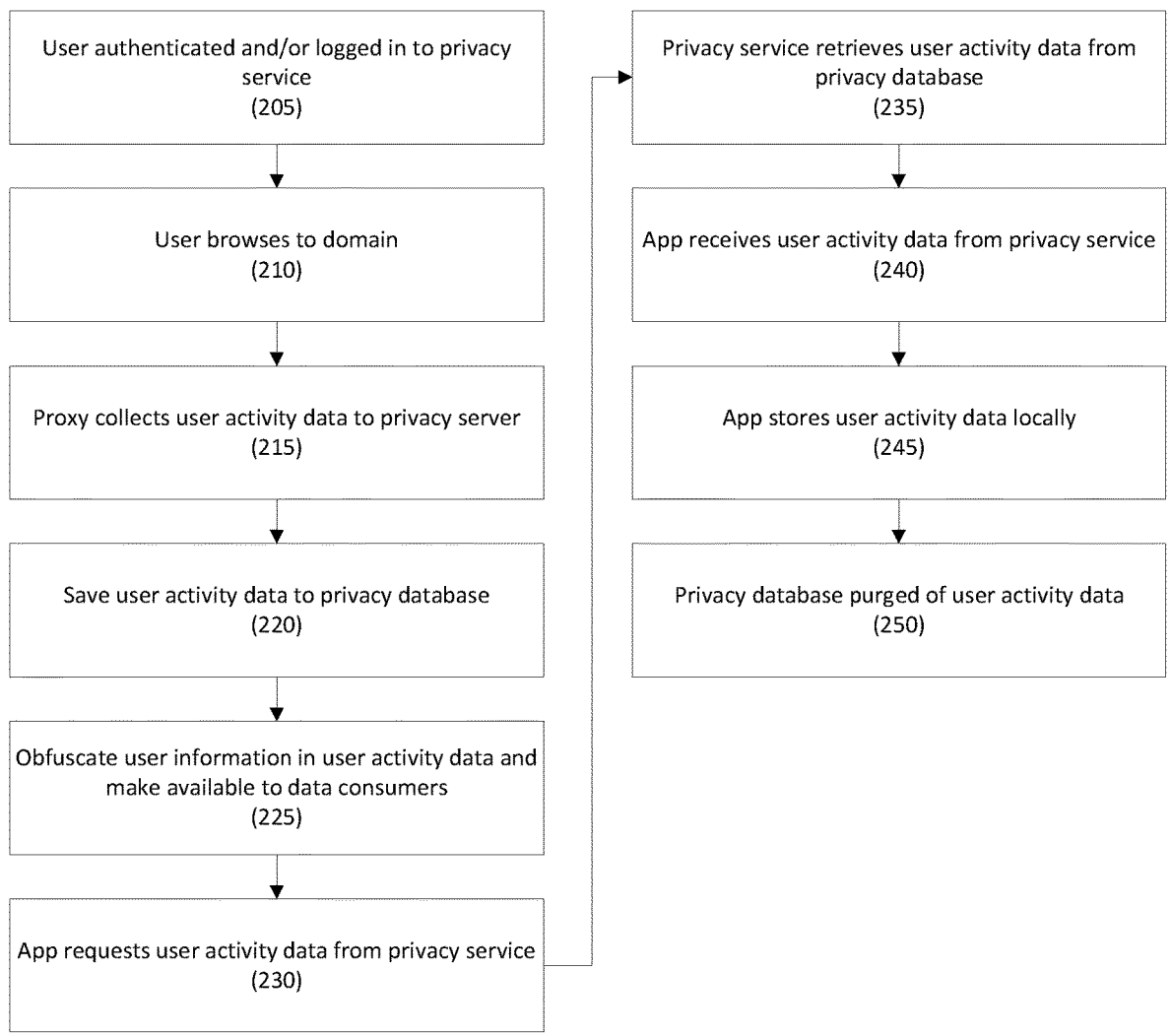
FIG. 2 depicts a method for local data storage metadata governance according to an embodiment.

Referring to FIG. 2, a method for local data storage governance is disclosed according to one embodiment.

In step 205, a user of an electronic device may log in to, or be authenticated by, a privacy service. Any suitable method for login and/or authentication may be used as is necessary and/or desired.

For example, the user may log in or be authenticated using a privacy application executed by the user's electronic device.

In step 210, the user may browse or access a domain, such as a website, a network location, etc. In one embodiment, the user may use a browser, an application, or any suitable interface that may collect user activity data (e.g., PII, electronic device identifying information, location data, browsing behavior, domains accessed, advertisements presented, etc.).

In step 215, a proxy between the electronic device and the domain may collect the user activity data and may provide the user activity data to a privacy service.

In embodiments, the proxy may be enhanced to identify malware, ads, and potentially block any security threats for that browsing session.

In step 220, the privacy service may save the user activity data as it is received from the proxy service to a privacy database. In embodiments, the user activity data may be encrypted at rest and/or in transit. The user activity data may be stored for the duration of a session (e.g., the user interaction with the domain), or it may be for a longer or shorter time. For example, the user activity data may be stored in the privacy data until requested by the user.

In step 225, the privacy service may obfuscate or otherwise clean the user activity data. For example, the privacy service may remove any PII, electronic device identifying information, location identifying information, etc. as is necessary and/or desired. In one embodiment, the privacy service may make the cleansed data available to one or more consuming systems.

In step 230, the privacy application executed by the electronic device may request the data from the privacy service. For example, at the conclusion of the session or interaction with the domain, or at any other time as is necessary and/or desired, the application may request the user activity data from the privacy service. In one embodiment, an API may be used to request the data from the privacy service. The API may be exposed as a software as a service solution.

In step 235, the privacy service may retrieve the data from the privacy database. In one embodiment, the type of data that is retrieved may be specified by the user via the privacy application. For example, the user may request that only certain user activity data, such as browsing history, be retrieved. The type of data, amount of data, etc. may be selected as is necessary and/or desired. In one embodiment, the amount of data retrieved may be limited using, for example, an offset as described below.

In step 240, the application may receive the data from the privacy database via the privacy service. In one embodiment, the privacy application may translate the data for local storage. It may further review the data received from the privacy databased and notify the user of the type of data user activity data that was collected, with whom the user activity data was shared, etc.

In step 245, the privacy application may store the data locally on the electronic device. Once the data is stored, the privacy application may send an acknowledgement to the privacy service. In one embodiment, the acknowledgement may be used using an API.

In step 250, after receiving the acknowledgement via an API, the privacy service may purge the data from the privacy database.

In embodiments, an API may address a situation where a chance that of a sync message failing due to network issues. For example, the API may have the client maintain the state of a message syncId generated by the server. The message syncId may be uniquely generated by leveraging a message id created when the message is logged into the database. For example, the message syncId may be determined as follows:

syncId=RandomStringUtils.randomNumeric(3)+ac- tivityId+Long.toString(System.currentTimeMil- lis( ))+RandomStringUtils.randomNumeric  (3).

In another embodiment, a globally unique identifier (GUID) may be used.

When the sync message API call fails, with the above algorithm in place, the client is may retry the message and may sync unsynced messages when connectivity is restored.

Embodiments provide functionality to reduce redundant polling to synchronize records between the client and the server. For example, the client may poll the server to sync all the messages until there are no messages for that user. Continuous polling may cause unnecessary network calls causing performance impact. Thus, in embodiments, the API "messagesQueued" may return the number that are queued to the client. The client keeps the state of the messagesQueued, so it knows to make the next API call until all the messages are drained. The offset is simply the number of un-synced messages for the user.

Embodiments may address failure in purging messages. The client may maintain two schemas to segregate between data that needs to be synced between the server and the client (sync store) and the data that needs to be shown in the UI from the client (local store). Once the message is synced, the data in the sync store needs to be purged. If the purge does not happen, the client needs to avoid pulling the duplicate data from the server, this is achieved by using the "syncId" and "lastMessageAck." The client can check attributes/fields in the API for syncId and if lastMessageAck is false, the client can then retry to pull the same message.

In embodiments, if the purge of the data in the privacy database fails, the data may automatically be deleted using a "time to live" settings. The time to live setting may be a time-based setting that specifies a time at which the data will be deleted. Thus, if not purged already, the privacy service may automatically delete the data in the privacy database at the expiration of the time to live.

In one embodiment, if additional audit proof(s) are required, a NFT (non-fungible token) may be created with the time to live, the syncId, etc., and the NFT may exist until it is "burned" or deleted, which may occur once the syncId or similar is no longer in the database. In one embodiment, the process of burning or deleting the NFT may be externalized as proof the audit process.

In one embodiment, the time to live setting may specify a date and time of deletion, an expiration (e.g., hours, minutes, etc.) for the data, etc.

Embodiments may address a missing acknowledgment message. The acknowledge API call is responsible for deleting the data in the system. If the acknowledge API call fails, and client requests data, the privacy service may return a new dataset and the "time to live setting" handles deletion of the data.

In one embodiment, if the client has more than a certain number of records in the privacy database, the client may pull the data from the privacy database using a plurality of calls instead of in a single call. The client may use an "offset" to pull records in batches until all the messages from the service are drained.

In one embodiment, the client may be configured to pull the data even when the client application is not running. For example, the application may spin up background threads during the app install, which may establish a connection to the privacy service to and continuously polls data from the service. The number of threads may be automatically increased if there is more data to poll.

If there is interruption in this process, the client may automatically resume by restarting.

In embodiments, when the API contract changes on the server side, client-specific versioning maintained by server may be used to minimize or eliminate any changes on the client side. For example, client-specific versioning may support the following:

client1→API version1
client1→API version2
client2→API version2
client2→API version1

Embodiments are agnostic to the data that is synchronized. For example, any data, such as transaction data, cryptograms, merchant information, etc. may be synchronized as is necessary and/or desired. In embodiments, transaction data including tokens, cryptograms, merchant information, may be synced to the client apps to make transactions and display merchant information.

Embodiments provide a rapid payment process (e.g., fewer than 5 milliseconds) that does not have to rely on network hops to transact data.

Embodiments may minimize fraud that can happen on the network layer. The communications between the client and the server are very minimal.

In embodiments, data may be silently pushed to the client device. The service is capable of identifying the unique users to the device.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
   authenticating, by a privacy service computer program, a user accessing a privacy service using a privacy application on an electronic device;
   receiving, by the privacy service computer program and from a proxy service, user activity data generated during an online activity, wherein the user activity data comprises personally identifiable information;
   saving, by the privacy service computer program, the user activity data, including the personally identifiable information, to a privacy database, wherein the privacy database temporarily stores the user activity data during the online activity;
   cleaning, by the privacy service computer program, the user activity data in the privacy database of the personally identifiable information;
   receiving, by the privacy service computer program and from the privacy application, a request for the cleaned user activity data;
   retrieving, by the privacy service computer program and from the privacy database, the cleaned user activity data;
   communicating, by the privacy service computer program, the cleaned user activity data to the privacy application, wherein the privacy application stores the cleaned user activity data in local storage on the electronic device;
   receiving, by the privacy service computer program, an acknowledgement of receipt of the cleaned user activity data; and
   purging, by the privacy service computer program, the cleaned user activity data from the privacy database.

2. The method of claim 1, wherein the user activity data is collected in an interaction with a website or domain.

3. The method of claim 1, wherein the user activity data further comprises electronic device identifying information, browsing behavior, domains accessed, and/or advertisements, and the privacy service computer program also cleans the user activity data of the electronic device identifying information, browsing behavior, domains accessed, and/or advertisements.

4. The method of claim 1, further comprising:
   making available, by the privacy service computer program, the cleaned user activity data to a consuming entity.

5. The method of claim 1, further comprising:
   purging, by the privacy service computer program, the user activity data following expiration of a "time to live" period.

6. The method of claim 1, wherein an amount and/or a type of cleaned user activity data communicated to the privacy application is based on a parameter.

7. The method of claim 1, wherein the request for the cleaned user activity data or the acknowledgement of receipt of the user activity data are communicated as an Application Programmable Interface (API).

8. An electronic device, comprising:
   a memory storing a privacy service computer program for a privacy service; and
   a computer processor;
   wherein the privacy service computer program is configured to:

authenticate a user accessing the privacy service using a privacy application on an electronic device;

receive, from a proxy service, user activity data generated during an online activity, wherein the user activity data comprises personally identifiable information;

save the user activity data, including the personally identifiable information, to a privacy database, wherein the privacy database temporarily stores the user activity data during the online activity;

clean, by the privacy service computer program, the user activity data in the privacy database of the personally identifiable information;

receive, from the privacy application, a request for the cleaned user activity data;

retrieve, from the privacy database, the cleaned user activity data;

communicate the cleaned user activity data to the privacy application, wherein the privacy application stores the cleaned user activity data in local storage on the electronic device;

receive an acknowledgement of receipt of the cleaned user activity data; and purge the cleaned user activity data from the privacy database.

9. The electronic device of claim 8, wherein the user activity data is collected in an interaction with a website or domain.

10. The electronic device of claim 8, wherein the user activity data further comprises electronic device identifying information, browsing behavior, domains accessed, and/or advertisements, and the privacy service computer program is configured to clean the user activity data of the electronic device identifying information, browsing behavior, domains accessed, and/or advertisements.

11. The electronic device of claim 8, wherein the privacy service computer program is further configured to make the cleaned user activity data available to a consuming entity.

12. The electronic device of claim 8, wherein the privacy service computer program is further configured to purge the privacy service computer program of the cleaned user activity data following expiration of a "time to live" period.

13. The electronic device of claim 8, wherein an amount and/or a type of cleaned user activity data communicated to the privacy application is based on a parameter.

14. The electronic device of claim 8, wherein the request for the user activity data or the acknowledgement of receipt of the user activity data are communicated as an Application Programmable Interface (API).

15. A system, comprising:
an electronic device comprising:
a memory storing a privacy application; and
a local data store;
a privacy server executing a privacy service computer program; and
a privacy database;
wherein:
the privacy application is configured to receive, from a user, authenticating information and communicate the authenticating information to the privacy service computer program;
the privacy service computer program is configured to authenticate the user;
the privacy service computer program is configured to receive, from a proxy service, user activity data collected in an interaction with a website or domain generated during an online activity, wherein the user activity data comprises personally identifiable information;
the privacy service computer program is configured to save the user activity data, including the personally identifiable information, to a privacy database, wherein the privacy database temporarily stores the user activity data during the online activity;
the privacy service computer program is configured to clean the user activity data in the privacy database of the personally identifiable information;
the privacy service computer program is configured to receive, from the privacy application, a request for the cleaned user activity data;
the privacy service computer program is configured to retrieve, from the privacy database, the cleaned user activity data;
the privacy service computer program is configured to communicate the cleaned user activity data to the privacy application, wherein:
the privacy application stores the cleaned user activity data in local storage on the electronic device;
the privacy application is configured to communicate an acknowledgement of receipt of the cleaned user activity data to the privacy service computer program; and
the privacy service computer program is configured to purge the cleaned user activity data from the privacy database.

16. The system of claim 15, wherein the user activity data further comprises electronic device identifying information, browsing behavior, domains accessed, and/or advertisements, and the privacy service computer program is configured to clean the user activity data of the electronic device identifying information, browsing behavior, domains accessed, and/or advertisements.

17. The system of claim 15, wherein the request for the cleaned user activity data or the acknowledgement of receipt of the user activity data are communicated as an Application Programmable Interface (API).

* * * * *